(12) United States Patent
Pfahler et al.

(10) Patent No.: US 6,771,670 B1
(45) Date of Patent: Aug. 3, 2004

(54) TIME-ALIGNMENT APPARATUS AND METHOD FOR TIME-ALIGNING DATA FRAMES OF A PLURALITY OF CHANNELS IN A TELECOMMUNICATION SYSTEM

(75) Inventors: Jürgen Pfahler, Meinheim (DE); Peter Jentsch, Heroldsberg (DE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 779 days.

(21) Appl. No.: 09/671,616

(22) Filed: Sep. 28, 2000

(30) Foreign Application Priority Data

Sep. 28, 1999 (EP) .............................................. 99119011

(51) Int. Cl.[7] .............................. H04J 3/06; H04L 27/06
(52) U.S. Cl. ........................ 370/503; 370/342; 375/229; 375/316; 375/341
(58) Field of Search ................................ 370/229, 335, 370/342, 503, 509, 510, 512; 375/229, 262, 341, 316

(56) References Cited

U.S. PATENT DOCUMENTS

| | | | | |
|---|---|---|---|---|
| 5,373,505 A | * | 12/1994 | Schmidt et al. | 370/368 |
| 5,521,920 A | * | 5/1996 | Nagase | 370/376 |
| 5,625,627 A | | 4/1997 | Ishi | |
| 5,684,794 A | | 11/1997 | Lopez et al. | |

FOREIGN PATENT DOCUMENTS

| | | |
|---|---|---|
| DE | 3623910 A1 | 1/1988 |
| EP | 0 503 657 A2 | 9/1992 |
| EP | 1 089472 A1 * | 4/2001 |
| EP | 1 0089475 A1 * | 4/2001 |
| WO | 98/59443 | 12/1998 |

OTHER PUBLICATIONS

Patent Abstracts of Japan, vol. 1996, No. 06, Jun. 28, 1996 & JP 08 037657 A (N II C Cable Media KK), Feb. 6, 1996.

* cited by examiner

*Primary Examiner*—Hassan Kizou
*Assistant Examiner*—Ahmed Elallar
(74) *Attorney, Agent, or Firm*—Nixon & Vanderhye, P.C.

(57) ABSTRACT

In a telecommunication system where data frames of a plurality of channels (CH1,CH2 . . . CHn) arrive with respective different time-offsets with respect to a common synchronization clock (WR, R/W, RD, T) of an internal frame structure of a decoder (DEC), three frame memories (RAM1, RAM2, RAM3) are used for performing a time-alignment of the data frames. The data frames are respectively written to two frame memories (RAM1, RAM2) having a read state and a reading of one frame memory (RAM3) is performed beginning with the occurrence of the common synchronization clock (T). A cyclic switching of the read/write state of the frame memories (RAM1, RAM2, RAM3) is performed, such that always two frame memories (RAM1, RAM2) are in a write-state (WR) and one frame memory (RAM3) is in a read-state (RD) The frame memory (RAM3) in the read-state is read out synchronized to the common synchronization clock.

15 Claims, 9 Drawing Sheets

OUTPUT DATA FRAMES FROM TIME ALIGNMENT APPARATUS

TIME-ALIGNMENT APPARATUS AND METHOD FOR TIME-ALIGNING DATA FRAMES OF A PLURALITY OF CHANNELS IN A TELECOMMUNICATION SYSTEM

FIELD OF THE INVENTION

The invention relates to a time-alignment apparatus of a receiver of a telecommunication system for receiving successive data frames on a plurality of channels. The respective data frames on said channels are not time-aligned to each-other and the time-alignment apparatus outputs data frames of all channels in a time-aligned manner with respect to a common synchronization clock. The invention also relates to a method performing such a time-alignment, a receiver of a telecommunication system and a telecommunication system in which such a time-alignment is performed in a receiver.

BACKGROUND OF THE INVENTION

In many telecommunication systems the individual data frames of a number of channels are not received on the radio link at exactly the same time. For example, if the telecommunication system is a mobile radio communication system, then the distances between the base transceiver station (BTS) and the mobile stations vary among a number of mobile stations, even over time during a connection, such that the data frames arrive in a non-time-aligned manner.

An example of such a mobile radio communication system is a CDMA system as shown with the base transceiver station BTS in FIGS. 5, 6. Generally, the above described aspects with respect to the time alignment are also applicable to any telecommunication system using a plurality of non-aligned channels.

In all telecommunication systems where several channels each comprising successive data frames are provided, a separate decoder dedicated to a specific channel must be provided in order to decode the successively arriving data frame of only one particular channel. However, this would result in up to 300 decoder units, which is unacceptable in terms of the required hardware effort. For this reason, there is always the problem of how a common decoder resource can be used efficiently for decoding the data frames of all channels. In principle, this can be achieved if the time which the decoder spends on decoding one data frame is much shorter than the duration of a data frame. Then, the decoder can process the data frames of several channels one after each other within one data frame period. However, this requires the incoming data frames to be buffered in a memory before they can be delivered in form of a constant stream of data frames to the decoder resource. For this purpose the data frames must be arranged to fit a given time grid, i.e. they must be aligned with respect to the internal frame structure of the decoder, i.e. to a common synchronization clock provided internally in the receiver.

The invention particularly relates to the problem of how the different time offsets of the received data frames of a great number of channels can be handled, such that only one common decoder resource is necessary.

SUMMARY OF THE INVENTION

As described above, due to the fact that the data frames from different channels have individual time offsets to the internal frame structure of the decoder, the data frames must be aligned to the internal synchronization clock in a well defined manner (frame alignment) to make it possible to use the decoder resources in a time sharing manner. In addition, a de-interleaving must often be performed, i.e. the received data frames must be rearranged (de-interleaved), before the frame can be decoded.

The object of the invention is to provide a time-alignment apparatus, a receiver of a telecommunication system, a telecommunication system and a time-alignment method, with which the decoder resources can be used efficiently even for a large number of channels.

SOLUTION OF THE OBJECT

This object is solved by a time-alignment apparatus of a receiver of a telecommunication system for receiving successive data frames on a plurality of channels, wherein said respective data frames on said channels are not time-aligned, and for outputting said data frames of all channels time-aligned to a common synchronisation clock, comprising:
  a) at least a first, second and third read/write frame memory for respectively storing one data frame of each of said channels, said frame memories each having a write state in which data is written to said frame memories and a read state in which data is read from said frame memories; and
  b) a control unit for cyclically switching said three frame memories through a first to third alignment mode synchronized to said common synchronisation clock such that
    b1) in said first alignment mode said first and second frame memory are in a write state and said third frame memory is in a read state;
    b2) in said second alignment mode said second and third frame memory are in a write state and said first frame memory is in a read state;
    b3) in said third alignment mode said third and first frame memory are in a write state and said second frame memory is in a read state;
    b4) wherein after each mode switching a newly arriving data frame of any channel is always written to a frame memory which was in a read state in the previous mode; and
    b5) wherein data frames are always read from the frame memory having a read state time-aligned to said common synchronization clock.

Furthermore, this object is solved by a receiver of a telecommunication system comprising one or more time-alignment apparatus.

The object is also solved by a telecommunication system comprising one or more receivers.

Furthermore, the object is solved by a method of successive data frames on a plurality of channels, wherein said respective data frames on said channels are not time-aligned, and for outputting said data frames of all channels time-aligned to a common synchronisation clock, comprising:
  a) writing data frames into at least a first, second and third read/write frame memory for respectively storing one data frame of each if said channel, said frame memories each having a write state in which data is written to said frame memories and a read state in which data frames is read from said frame memories; and
  b) cyclically switching said three frame memories through a first to third alignment mode synchronized to said common synchronisation clock wherein
    b1) in said first alignment mode data frames are written to said first and second frame memory in a write state and data frames are read from said third frame memory in a read state starting with each common synchronization clock;

b2) in said second alignment mode data frames are written to said second and third frame memory in a write state and data frames are read from said first frame memory in a read state starting with each common synchronization clock;

b3) in said third alignment mode data frames are written to said third and first frame memory in a write state and data frames are read from said second frame memory in a read state starting with each common synchronization clock; wherein b4) after each mode switching a newly arriving data frame of any channel is always written to a frame memory which was in a read state in the previous mode;

b5) wherein data frames are always read from the frame memory having a read state time-aligned to said common synchronization clock.

According to one aspect of the present invention, three frame memories are used. Each frame memory can hold one complete data frame of all channels. During one synchronization clock period two memories are used to write data in and one is used to read data out. Incoming data frames are always written to one of the frame memories in a write state when they are received. Since the time offset between the data frames of the individual channels and the synchronisation clock can vary between 0 and one whole frame period, it can, however, take up to two synchronisation clock periods, until one whole data frame from every channel is stored in one frame memory. Since it can take up to one entire frame period until the data frame, which has been fully written into a frame memory, is read out, and another data frame of the same channel will arrive directly after the pervious frame, a second memory in a write state is used.

Whilst writing the individual data frames of the plurality of channels to one of the two frame memories, the third frame memory (in the read-state) is read out. When the next common synchronization clock occurs, the alignment mode of the three frame memories is cyclically changed. That is, the frame memory used for reading in one alignment mode will then be used as a frame memory for writing and one of the two frame memories previously being used for writing is now used for reading. It is important that after each cyclic change a newly arriving data frame of each channel is always written to the frame memory which was in a read state in the previous mode.

PREFERRED ASPECTS OF THE INVENTION

In the above described aspect of the invention, data frames of a plurality of channels are present in one frame memory having a read-state and this frame memory is read out starting with the occurrence of the common synchronization clock. One possibility is to store one data frame in one row and also to read out the data frame synchronized to the common synchronization clock along the row direction. However, in many communication systems, on the transmitter side a bit-interleaving has been performed. In order to supply the time-aligned frames in the correct de-interleaved format, a de-interleaving must be performed in the receiver. Advantageously this can be carried out in the present invention by writing to the frame memories in the row-direction and reading-out the frame memories in the column-direction. Therefore, time-alignment and de-interleaving can be performed without increased effort in terms of hardware.

When the time-alignment apparatus, the receiver and the method are used in a telecommunication system using a convolutional coding/decoding, for example with a coding rate of $r=\frac{1}{2}$ or $r=\frac{1}{3}$, as well as a soft-output equalizer, then the data information present in the data frames will be occurring as 2–3 symbols scrambled according to the interleaver, each with e.g. 4 soft-decision bits. Advantageously, each symbol is stored in one cell of the memory.

Further advantageous embodiments and improvements of the invention can be taken from the following description and the dependent claims. Hereinafter, the invention will be explained with reference to its embodiments and with reference to the attached drawings.

BRIEF DESCRIPTION OF THE DRAWINGS

In the drawings:

FIG. 1-2 illustrates how respective data packets belonging to respective data frames on a plurality of channels CH12, ..., CH8 arrive at the input of the time-alignment apparatus shown in FIG. 1-1;

FIG. 1-3 shows the time-aligned data frames of a plurality of channels CH1, ... CH8 output by the time-alignment apparatus shown in FIG. 1-1;

FIG. 2-1 shows a time diagram of storing successive data frames in three frame memories RAM1, RAM2, RAM3 according to the invention;

FIG. 2-2 shows a different illustration of the data frame writing and reading in connection with FIG. 2-1;

FIG. 2-3 shows a number of output data frames from the time alignment apparatus;

FIG. 3 shows the sequential switching between individual time-alignment modes and the writing of a new data frame into a frame memory which was in a read-state in the previous mode;

FIG. 4-1 shows the reading and writing of a memory matrix for performing a bit-de-interleaving in the receiver, wherein no soft-output equalizer is used in the receiver;

FIG. 4-2 shows the reading and writing of a memory matrix for performing a symbol-wise de-interleaving in the receiver, if a soft output equalizer/demodulator is used in the receiver;

In the drawings the same or similar reference numerals denote the same or similar parts or steps in all figures.

DESCRIPTION OF THE CDMA TELECOMMUNICATION SYSTEM

Hereinafter, a CDMA base transceiver station is explained to which the time-alignment apparatus and method of the invention can be applied. However, it should be understood that the description of the CDMA system only serves as application example for the present invention and that the invention can be applied to any other telecommunication system and receiver in which several channels each provide successive data frames which have time-offsets to each other. Therefore, the invention can be applied to any telecommunication system and receiver which implement a physical layer data processing in a time-frame oriented manner.

Figure 5:
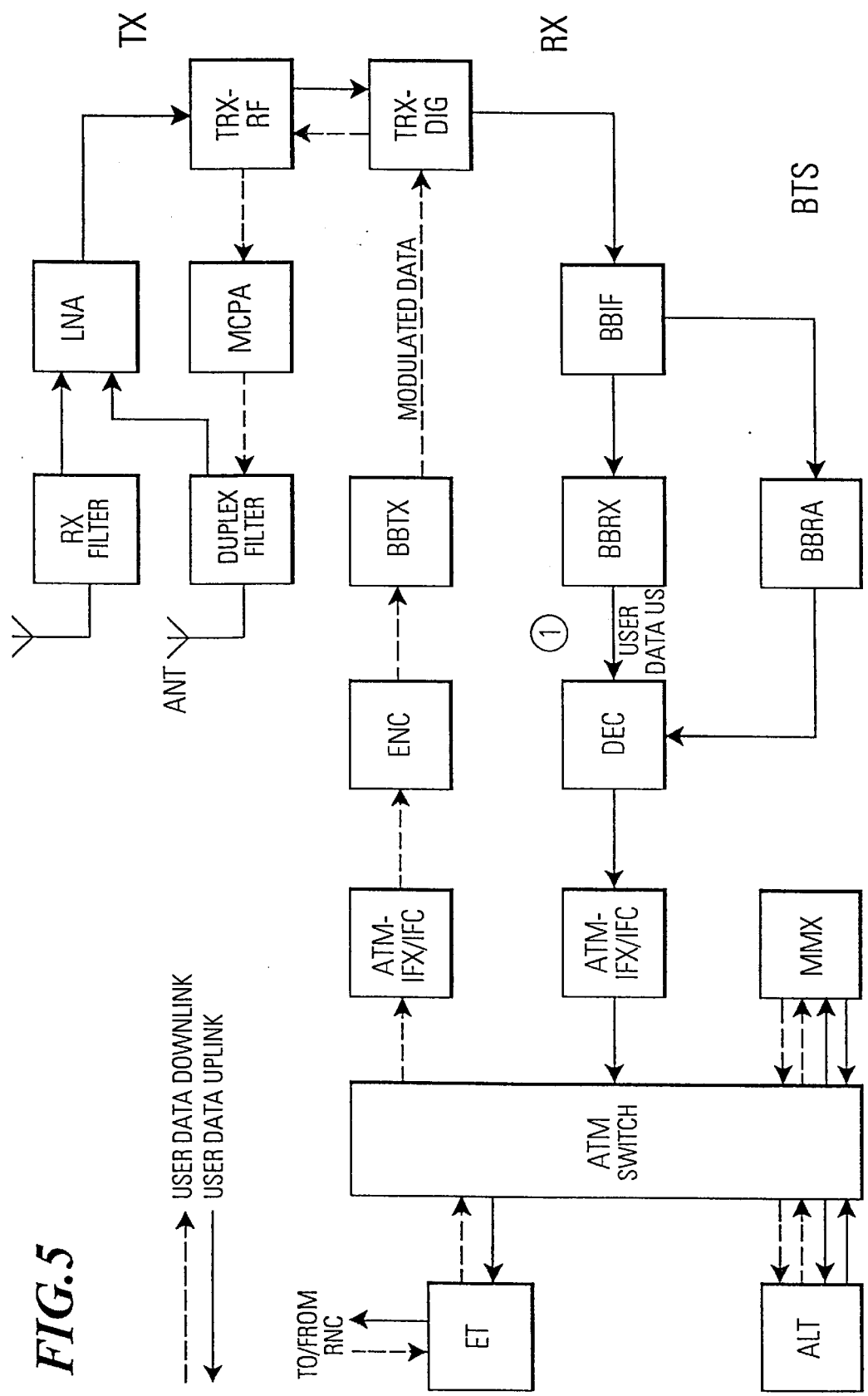
FIG. 5 shows an overview of a base transceiver station of a CDMA telecommunication system to which the time-alignment method according to the invention can be applied.

Briefly summarized, FIG. 5 shows a block diagram of a base transceiver station BTS of a CDMA-system comprising a transmitter TX (upper branch in FIG. 5) and a receiver RX (lower branch in FIG. 5). In the transmitter TX, user data US, for example in the form of ATM packets, is input into a channel encoder unit ENC via an ATM switch and a corresponding interface (ATM IFX/IFC). The coded (and also by a baseband unit BBTX. The modulated data is then filtered and converted to an analog signal in the unit TRX-DIG, upconverted to the desired carrier frequency in the unit TRX-RF, amplified by a power amplifier unit MCPA and finally transmitted to an antenna ANT via a duplex filter.

In the receiver, two antennas (diversity reception) are commonly used to receive the signal which is then amplified in the unit LNA, downconverted in the unit TRX-RF, A/D converted and filtered in the unit TRX-DIG. Then, the data is demodulated by a RAKE receiver/despreader in the baseband unit BBRX while random access channels are detected and demodulated in the unit BBRA. The user data US are then decoded in the decoder unit DEC and transmitted to the ATM switch via an ATM interface ATM IFX/IFC.

Figure 6:
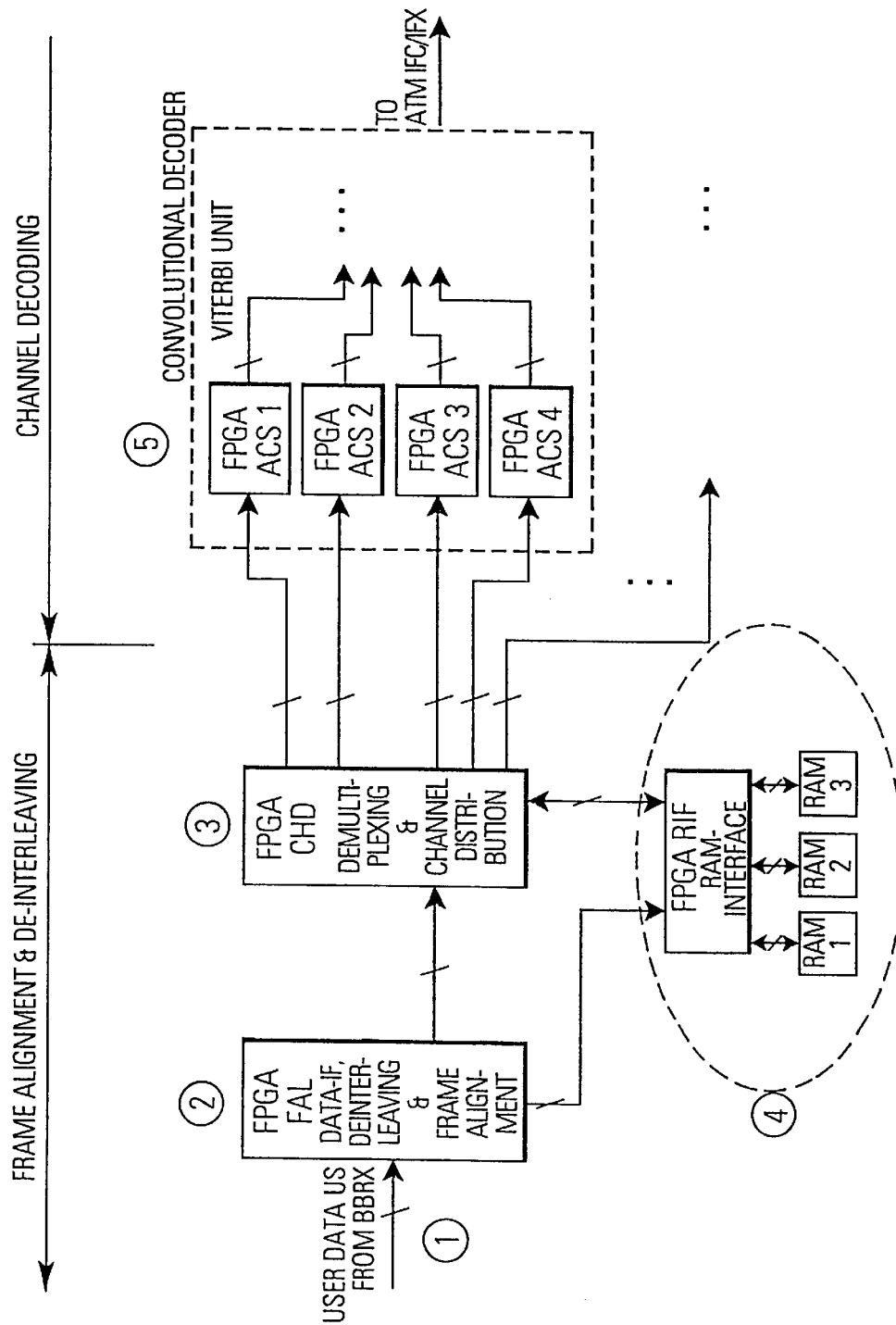
FIG. 6 shows an overview of the internal structure of the decoder unit DEC schematically illustrated in FIG. 5.

FIG. 6 shows an FPGA-based solution (FPGA: field programmable gate array) of the decoder unit DEC in FIG. 5. As is seen in the hardware structure of the decoder unit DEC in FIG. 6, user data US from a plurality of channels (e.g. up to 300 channels) is input (serially or parallely) at ① from the RAKE receiver/despreader BBRX (see FIG. 5). The unit ② (FPGA-FAL; FAL: Frame ALignment) together with the unit ③ (FPGA-CHD; CHD: CHannel Distribution) essentially performs the de-interleaving and the frame alignment of the received data according to the invention. During this process, the unit ② writes data in a specific order to unit ④ (memory block consisting of frame memories RAM1, RAM2, RAM3 (RAM: Random Access Memory) and a FPGA for interfacing the frame memories) at the time when the data is received, whereas the unit ③ reads the data in another order at a specific time related to the internal frame structure of the decoder, i.e. according to the common synchronization clock of the decoder. The writing of data into the memory in one order and the reading out of data therefrom in another order is commonly referred to as interleaving and de-interleaving, respectively. The specific way of writing the data frames to the frame memories RAM beginning at the time when they are received and reading them after the occurrence of the common synchronization clock of the decoder (related to the internal frame structure of the decoder) is called frame alignment (FAL). After the data is read from the memory block (unit ④) by the unit ③, they are sent to the unit ⑤ (Viterbi decoder unit) for decoding.

As is seen in FIG. 6, according to the invention one decoder unit (Viterbi unit ⑤) is essentially used for decoding data frames of a great plurality of channels in connection with three frame memories RAM1, RAM2, RAM3. Thus, the decoding resources can be used commonly for all channels, such that an efficient use of the decoding hardware is possible. To allow this efficient exploitation of the decoding hardware, the data frames of all channels are provided in a well-defined manner with respect to the common synchronisation clock.

A time-alignment apparatus of the receiver generally explained with reference to FIGS. 5, 6 may be seen as constituted by the special arrangement of the respective three frame memories together with the controlling of the reading and writing to the three frame memories with respect to the common synchronization clock (here provided by the frame structure of the decoder unit DEC). The present invention relates to the special reading and writing to the three frame memories with respect to the common synchronization clock. The embodiment of such a time-alignment apparatus and method of the invention (as contained in the decoder unit DEC shown in FIG. 5 and FIG. 6) will be explained below with reference to FIGS. 1-3.

It may also be appreciated from FIG. 6, that the special time alignment and de-interleaving performed by such a time-alignment apparatus according to the invention is independent of the specific decoding procedure used in the decoder unit ⑤. The only requirement is a common synchronization clock for providing to the decoder ⑤ a plurality of data frames in a time-aligned manner. Therefore, the time alignment apparatus and method described below as a preferred embodiment of the invention is not restricted to the special embodiment of the CDMA receiver of FIGS. 5, 6.

PRINCIPLE OF THE TIME ALIGNMENT PROCEDURE

Figure 1:
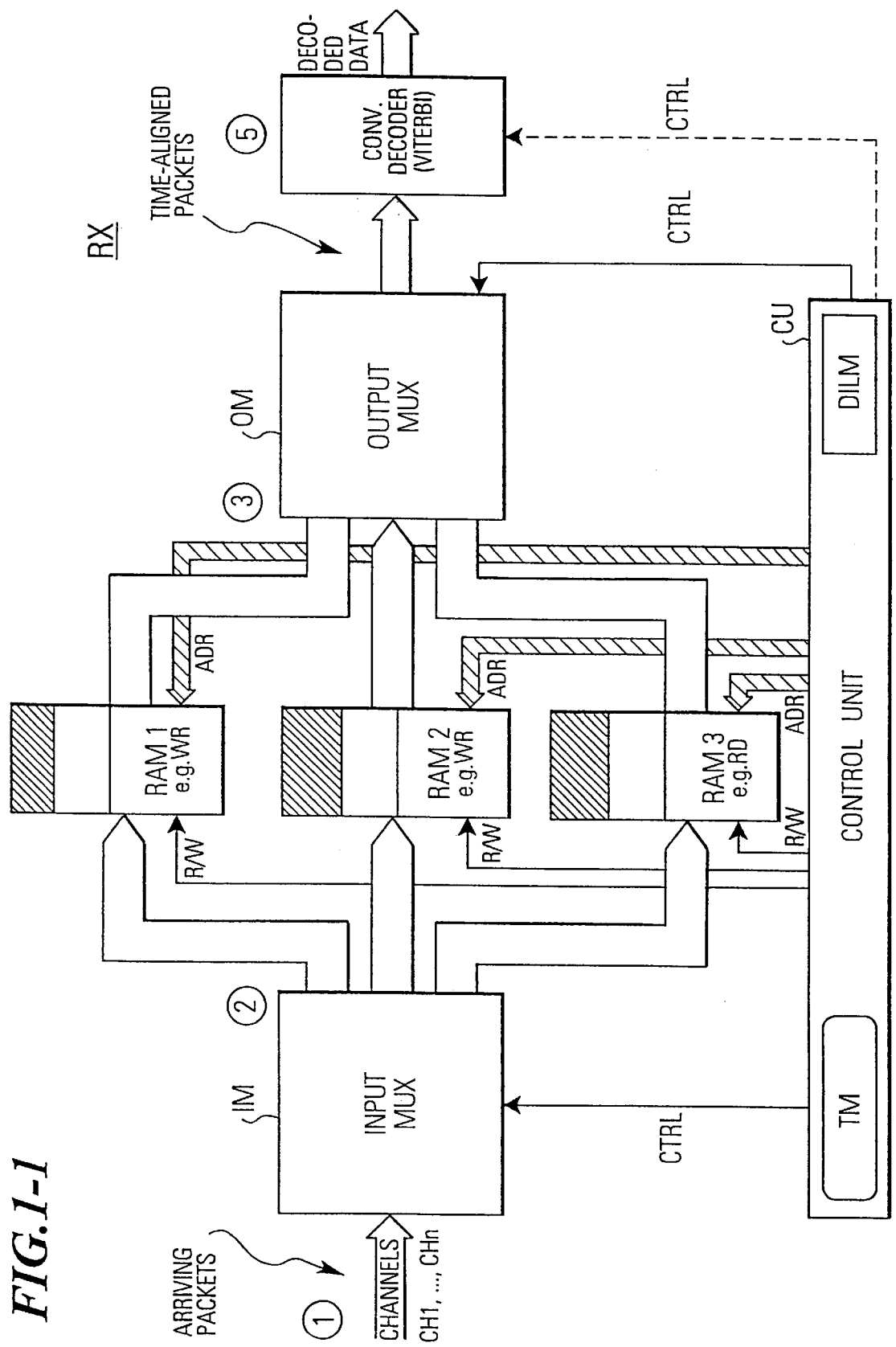
FIG. 1-1 shows a block diagram of a time-alignment apparatus of a receiver RX according to the invention.

FIG. 1-1 shows a block-diagram of a time-alignment apparatus in a receiver RX of a telecommunication system. For illustration purposes reference numerals ①-⑤ schematically correspond to arrangements of units in the decoder implementation example shown in FIG. 6.

In FIG. 1-1, on each of a plurality of the channels CH1, . . . , CHn successive data frames arrive at ①. In the present invention, each channel has a fixed and constant data rate. On the other hand, a user may use several applications with different data rates. A user channel thus comprises one or more of the single channels with the constant data rate.

Figures 1, 2:
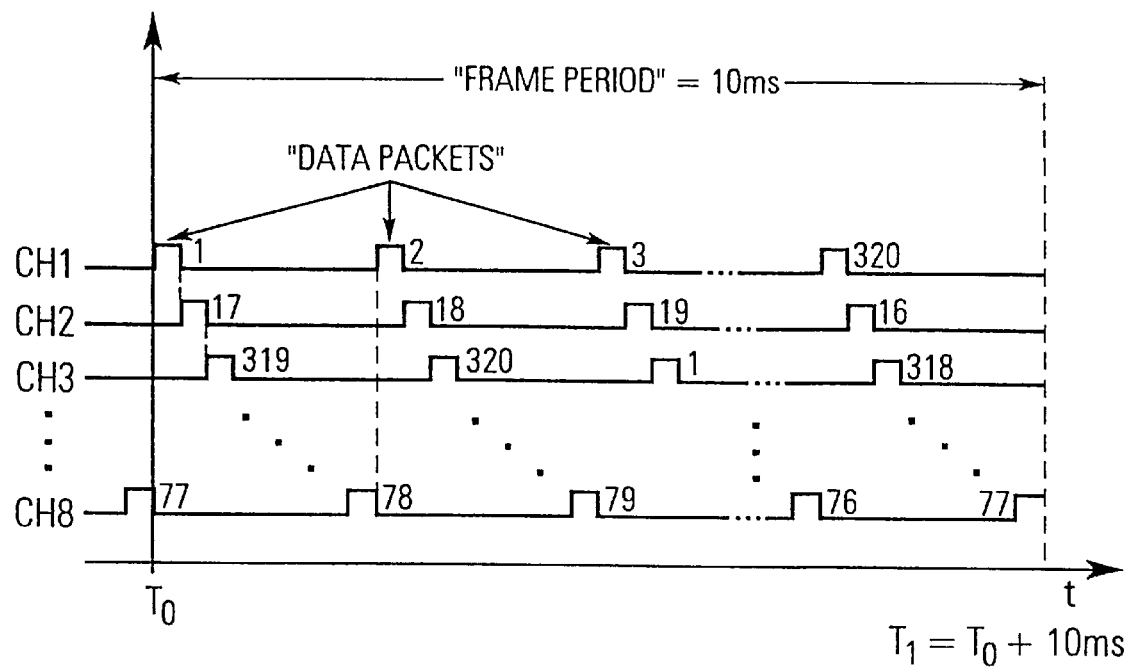

FIG. 1-2 shows as an example how the data of 8 channels CH1, . . . , CH8 arrive at ① within a frame period of 10 ms. The data of a respective channel arrives e.g. in 320 successively arriving data packets. The data packets of the 8 channels can arrive in a time sharing manner, i.e. time multiplexed, or in parallel. Each data packet comprises, for example as payload, 2 soft bits. These soft bits can be transferred sequentially on a 4 bit wide bus. Therefore, in this case the bus would comprise 4 lines for all data packets of the 8 channels CH1, . . ., CH8. Any further sets of channels CH9, . . . , CH16 or CH17, . . . , CH24 (not shown in FIG. 1-2) etc. would need further buses each with 4 lines. Alternatively, if e.g. all bit components of the soft bits would be transferred sequentially a bus consisting only of a single line would be sufficient.

Whilst in the invention it is rather irrelevant whether the respective data packets arrive on the channels in a time multiplexed manner or in parallel on the provided bus, it is important to note, that all data packets of all channels (in the illustrated case 8 channels) arrive in a single frame period of e.g. 10 ms.

A data frame of a single channel is constituted by the sequential series of the e.g. 320 data packets independent as the whether they arrive in parallel or time multiplexed. The start timing of a data frame is always the timing at which the (first) data packet 1 is received in the respective channel and the end timing is one frame period of e.g. 10 ms later, i.e. at the receipt of the 320-th data packet. In FIG. 1-2, the channel CH1 is time-aligned since the start timing of the first data packet 1 coincides with the common synchronisation clock. Considering as an example the time multiplexed arrival of data in FIG. 1-2, then channel CH2 is misaligned (delayed) with the time interval 16*10 ms/320, since the first data packet of channel CH2 would arrive directly after the first data packet of channel CH1, if the graph for CH2 was moved to the right to such a time interval.

Figures 1, 2, 3:
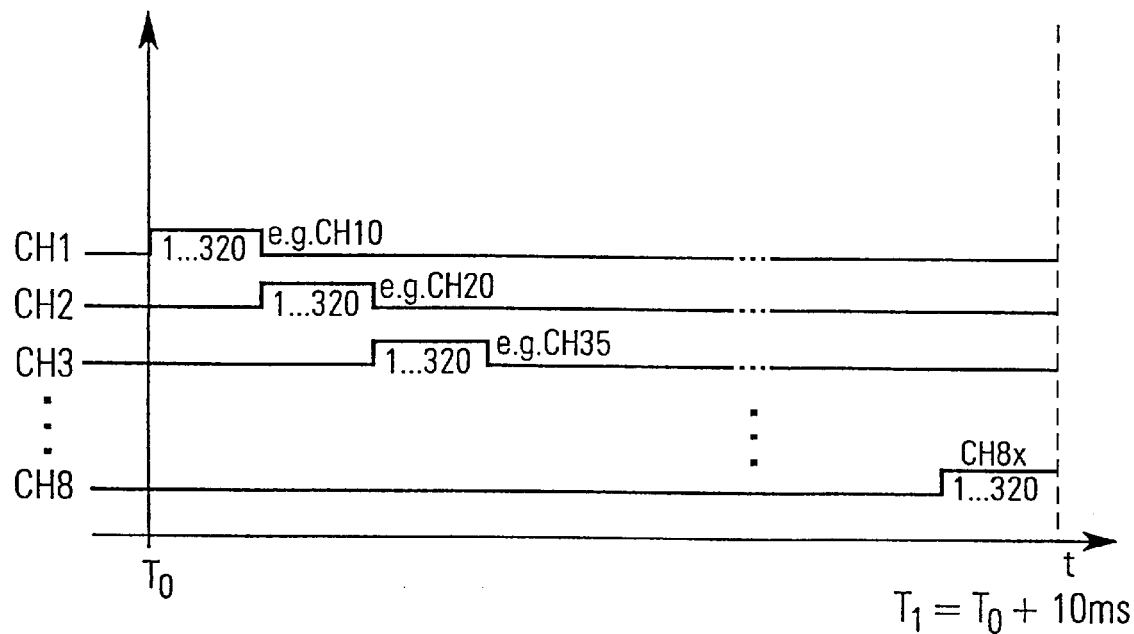
Figures 1, 2:
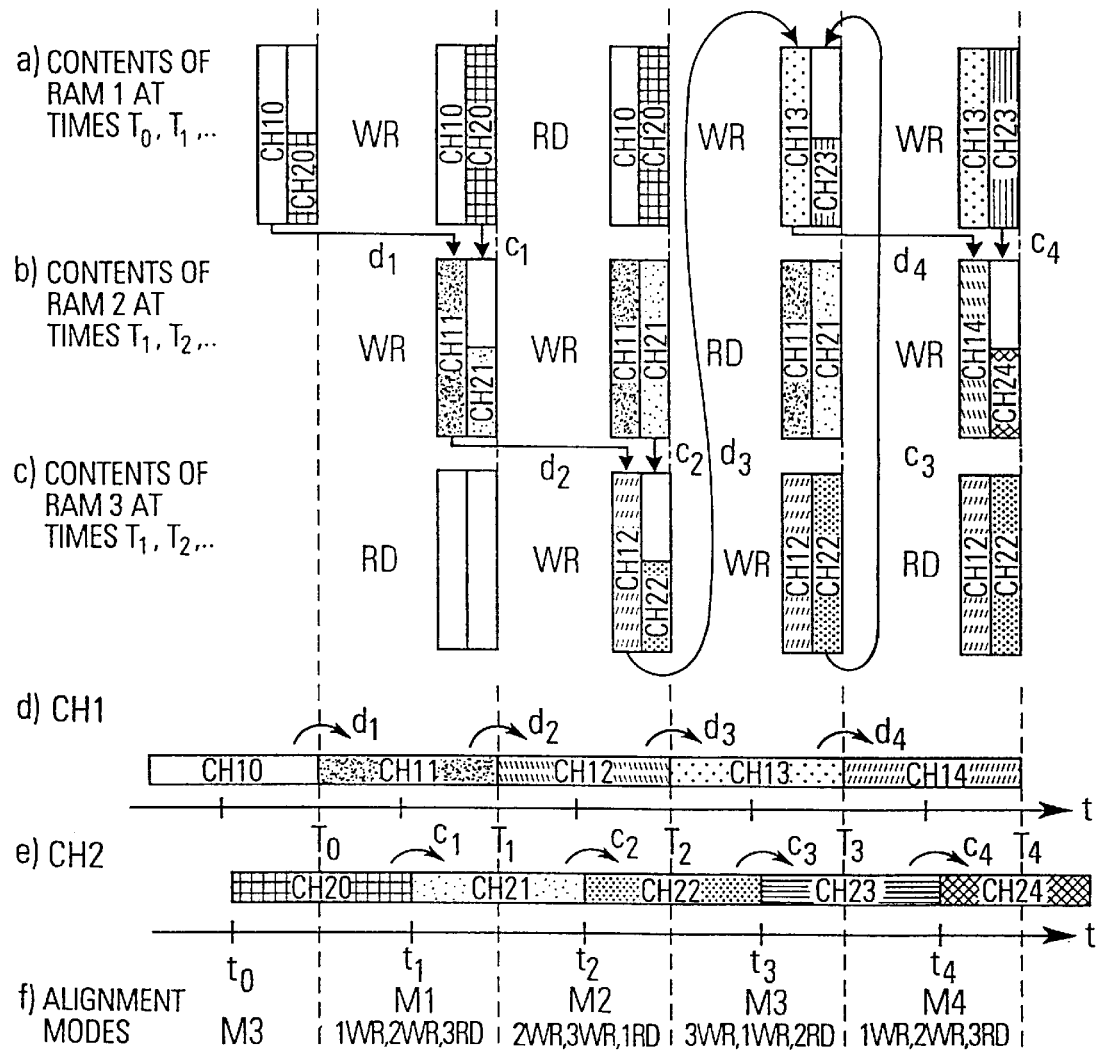
Figure 2:
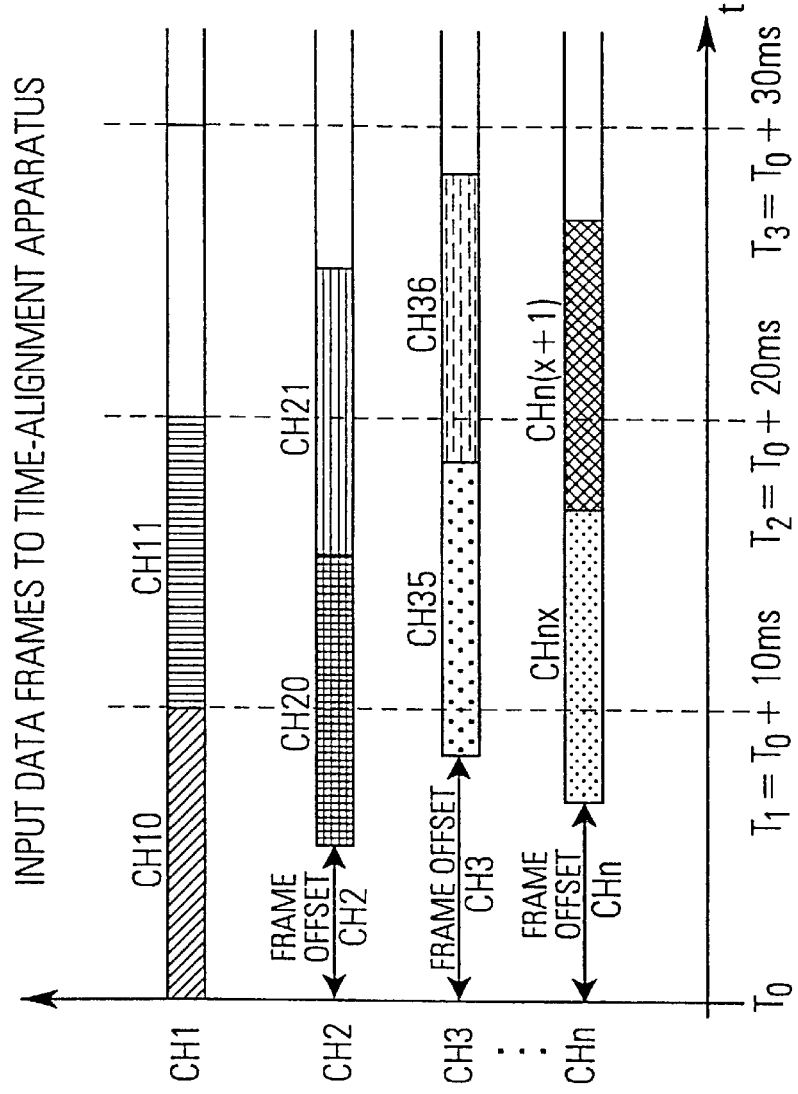
Figures 2, 3:
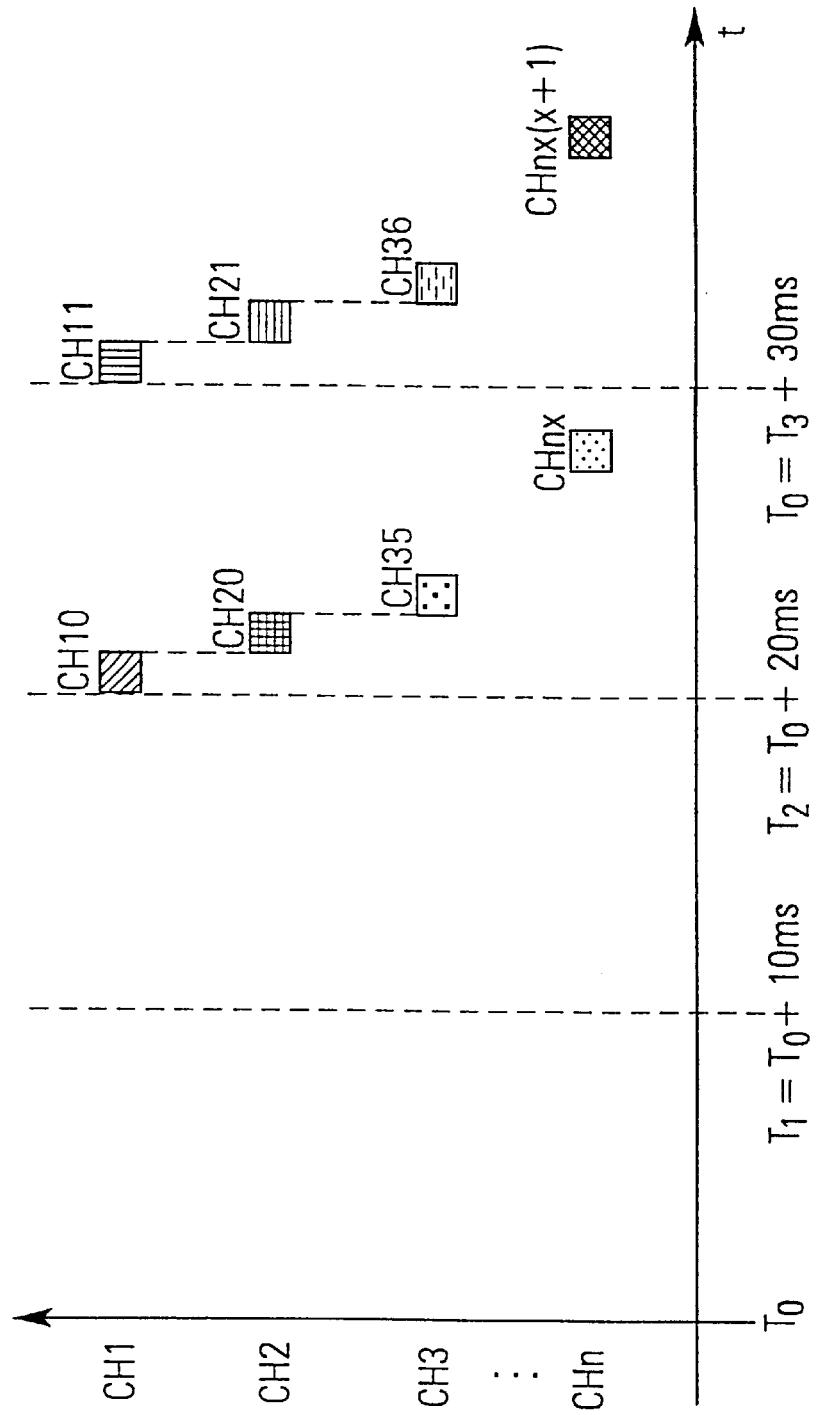
Figure 3:
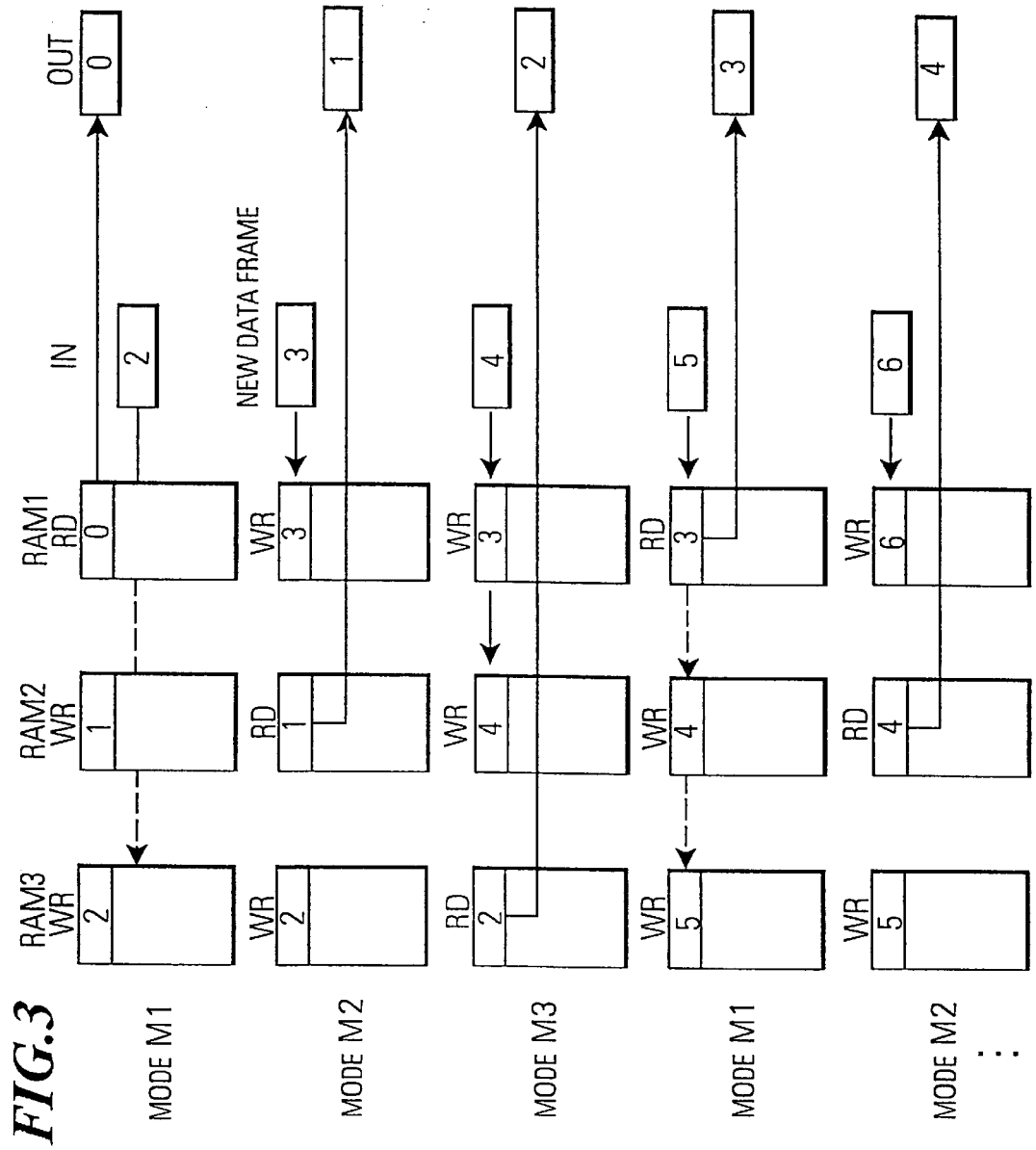

The time-alignment apparatus according to the invention shown in FIG. 1-1 rearranges the data packets in the channels such that a succession of data packets as shown in FIG. 1-3 is obtained. First, all the data packets belonging to a data frame of channel CH1 are provided, then all data packets belonging to the data frame of channel CH2 are provided etc. Hence, the time-alignment to a common synchronisation clock does not mean that the data frames of the respective channels are all aligned to the start timing $T_0$, $T_1$, of a respective frame period. Quite to the contrary, the alignment to a common synchronisation clock means that the data frames starting with their respective first data packet follow each other according to a fixed time pattern (i.e. sequentially) within the time interval $T_0 \rightarrow T_1$. All eight data frames arriving sequentially in this fixed time pattern (and being aligned to $T_0$ in this time pattern) can now be processed sequentially (i.e. serially) by a single Viterbi decoding unit, e.g. by an Add-Compare-Select unit ACS1 (known per se) of the convolutional decoder at ⑤ in FIG. 6. Simultaneously, i.e. parallely, further ACS units ACS2, ACS3 and ACS4 in the convolutional decoder process the further channels CH9 . . . 16, CH17 . . . 24 etc. This means that per ACS unit the processing is serial for the respective set of channels, whilst viewed together the 4 ACS units operate in parallel.

The number of data frames from the respective channels which can be read out and processed within one time interval of e.g. 10 ms beginning with the common synchronisation clock depends on the time needed by the respective decoding unit for decoding the respective data frame. Furthermore, whilst it is preferred that the processing is performed such that the data frames are processed one after the other for an optimal use of the time interval of 10 ms, of course the sequential reading out and processing may also be performed such that in between two data frame reading operations there is a short time delay. Thus, the processing time in the decoder will determine how many data frames are read out and processed sequentially in the fixed time interval of 10 ms.

That is, only if one considers one separate channel, all data frames (of this channel) really arrive sequentially. If one considers all channels, the data frames arrive in parallel, however, with respective time-off sets to the common clock. The reading out of the data frames does also not really occur simultaneously, but sequentially, at least in as far the reading out of the channels CH1, . . . , CH8 is concerned. On the other hand, the data frame of the channel CH9 of the next set of channels which is handled by the second ACS unit ACS2, is read out simultaneously with the corresponding data frame from the channel CH1.

As explained above, the time-alignment apparatus according to the invention aligns the data frames consisting of the successive data packets according to a predetermined time pattern with respect to the common synchronisation clock $T_0$. Whether of not the successive data packets actually have a time delay to each other (as shown in FIG. 1-2) or not is as far as the time alignment procedure is concerned irrelevant (since this will depend on the way how they are presented at the input of the time-alignment apparatus, e.g. time multiplexed or in parallel). Thus, the data packets may already be present in a form where they are provided successively with no time delay. The important aspect for the time-alignment procedure is that the start timing of the respective data frames, i.e. the start timing of the first data packet, does not occur in accordance with the preset time pattern, i.e. that the first data packet of the next channel does not start exactly when the last packet of the last channel ends, so as to fit one data frame of all channels in one single frame period.

FIG. 2-2 and FIG. 2-3 show the general time relationships that can exist at the input and the output of the time alignment apparatus according to the invention, i.e. the incoming data frames at ① and the time-aligned data frames read out at ③, respectively. As will be explained with more detail below, in FIG. 2-2 the respective data frames in channels CH2, CH3 and CHn are offset to the beginning of the frame period, i.e. the synchronisation clock $T_0$, and only the data frames of channel CH1 are aligned thereto. In FIG. 2-3, in each frame period all data frames of all channels follow each other and thus a single data frame of all channels fits into one frame period.

First Embodiment (Time Alignment Using Three Memories

In FIG. 1-1, showing one embodiment of the invention, reference numerals ①–⑥ denote the corresponding part in FIG. 6.

As explained above, on each of the plurality of channels CH, . . . , CHn, successive data frames arrive at ①, wherein respective data frames on said channels have a time-offset to each other. On the other hand, at the output of the time-alignment apparatus (see reference numeral ③), time-aligned frames are output to a decoder unit ⑤ and the decoded data is output from the decoder unit ⑤ for a plurality of channels. A control unit CU comprises a timing means TM which provides a common synchronization clock (corresponding to the internal frame structure of the decoder unit DEC) as well as some control signals CTRL. At least, a first, a second and a third read/write frame memory RAM1, RAM2, RAM3 for respectively storing said data frames of said channels are provided. The frame memories each have a write state WR, in which data can be written to said frame memories, and a read state RD, in which data can be read from said frame memories. The read/write state of each memory can be controlled by outputting a respective R/W control signal by the control unit CU to the individual frame memories as is indicated in FIG. 1-1.

As explained above, the data frames on the channels may arrive at ① in a serial (time multiplexed) and/or parallel format. The input multiplexer (in the following also referred to as an input means IM) selects data from the data frames at the input ① and provides them to the frame memories RAM1 . . . RAM3 in response to the CTRL signal provided by the control unit CU. The control unit CU specifies the addresses ADR where the data is to be stored in the frame memories. Thus, for each channel the input means IM successively provides the data and the control unit CU controls the write/read state (by the read/write signals R/W) of the three frame memories as well as the CTRL signal, such that data frames are always written into one out of two frame memories in a write state and data is read synchronized to the common synchronization clock from one frame memory having a read state. For example, if in FIG. 1-1 the frame memory RAM3 has a read state, data frames can only be read out from RAM3 and data is only written to one of the two other frame memories RAM1, RAM2. The read/write state of each frame memory is controlled with the read/write signals R/W) issued by the control means.

Thus, the output multiplexer (in the following also referred to as output means OM) ③ respectively reads data frames only from the frame memory in the read-state. For this purpose, a control signal CTRL is applied to the output means OM by the control unit CU synchronized to the common synchronization clock. That is, with each occurrence of the common synchronization clock all data frames stored in one frame memory in a read state are read out. These time-aligned data frames are then provided to the decoder unit ①.

Furthermore, the control unit CU implements a deinterleaving of each data frame by setting the read addresses of the frame memories for the output means OM in another order than the write address for the output means IM. This is indicated in FIG. 1-1 by a de-interleaving means DILM and will be described below with further details in the second embodiment.

Whilst FIG. 1-1 only shows a possible configuration of how the provision of data frames to the three frame memories and the reading out of data frames from the three frame memories is performed, it should be understood that other configurations of the input means IM, the output means OM, and the control unit CU can be envisaged and that the important aspect of the present invention resides in how the individual memories are used regarding their read- and write-state with respect to the common synchronization clock, as will be explained below with reference to FIG. 2-1, FIG. 2-2, FIG. 2-3 and FIG. 3.

FIG. 2-1a, FIG. 2-1b and FIG. 2-1c show the entries of the three frame memories RAM1, RAM2, RAM3, respectively, for two channels CH1, CH2 at the occurrence $T_0, T_1, \ldots, T_4$ of the common synchronizing clock. The first, second and third frame memory RAM1, RAM2, RAM3 respectively store data frames of the channels CH1, CH2 and the frame memories each have a write state WR in which data can be written to it and a read state RD in which data frames can be read from the frame memory where the current state (WR/RD) is marked in FIGS. 2-1a, b and c.

FIG. 2-1d shows a number of successively arriving data frames $CH_{10}, CH_{11}, CH_{12}, CH_{13}, CH_{14}$ for the channel CH1. On the horizontal axis in FIG. 2-1d a time line is indicated as well as the occurrences $T_0, T_1, T_2, T_3, T_4$ of the common synchronization clock. Here it is assumed for illustration purposes that the successive data frames of the first channel CH1 are perfectly aligned with the occurrences of the common synchronization clock. That is, the frame $CH_1$ starts e.g. at the occurrence $T_0$ of the common synchronization clock, and ends at the next occurrence $T_1$ of the common synchronization clock. Of course, in the general case (see the data frames of channel CH2 in FIG. 2-1e) the data frames are not perfectly aligned with the common synchronization clock. However, among a great plurality of channels indeed one of them may be perfectly aligned with the common synchronization clock.

For all periods in between the occurrences of the common synchronization clock, a so-called alignment mode is indicated in FIG. 2-1f. Three alignment modes can be distinguished, namely:

Mode "M1": 1WR, 2WR, 3RD; the first frame memory is in the write-state WR, the second frame memory is also in a write-state WR and the third memory is in a read state RD;

Mode "M2": 2WR, 3WR, 1RD: the second frame memory is in a write state WR, the third memory is also in a write state WR and the first memory is in a read state RD; and Mode "M3": 3WR, 1WR, 2RD: the third memory is in a write state WR, the first memory is also in a write state WR and the second memory is in a read state RD.

The alignment modes M1-M3 are maintained during the respective synchronization clock periods from $T_0$ to time $T_1$, $T_1$ to $T_2$, and $T_2$ to $T_3$ respectively. After time instant $T_3$, the alignment modes are repeated in the same order. Thus, FIG. 2-1d shows the cyclic switching through of three kinds of alignment modes M1, M2, M3. That is, with the occurrence of each common synchronization clock, a predetermined read/write state of the three frame memories is switched on. Therefore, the switching of the alignment modes is indeed synchronized to the common synchronization clock $T_0$–$T_4$ whilst as an example only the data frames of the first channel CH1 are assumed to be synchronized to the common synchronization clock too. It should be emphasized here that each frame memory in a read state RD is always read out beginning with the next occurrence of the common synchronization clock while the frame memories in a WR state are written at the time when the data arrive.

FIG. 2-1e shows the data frames $CH_{20}, CH_{21}, CH_{22}, CH_{23}, CH_{24}$ of the channel CH2. Despite the fact that the individual data frames arrive successively and have the same length (e.g. 10 ms) as the data frames of the first channel CH1, it can be seen from FIG. 2-1e that there is a time-offset with respect to the common synchronization clock. As an example it is here assumed that the time-offset with respect to the common synchronization clock (and in the special example in FIG. 2-1d also with respect to the data frames of the first channel CH1) is exactly half a data frame period. This means, that at the occurrences $T_0, T_1 \ldots T_4$ of the common synchronization clock only half a data frame (e.g. the first half of the data frame $CH_{20}$) has been written to a frame memory in a write state WR in the time period from $t_0$–$T_0$. Indeed, individual data frames are always written into respective memory locations of the same frame memory. Only the time period of the writing process is different among the different channels. As can be seen for example by considering the frame memory RAM1 (FIG. 2-1a) in the first alignment mode M1, indeed the data frame $CH_{20}$ has been written completely to the frame memory RAM1 at time $T_1$, however, the writing to the frame memory RAM1 does not start and end synchronized with the synchronization clock occurrences $T_0, T_1$ due to the time-offset. Therefore, the first half of $CH_{20}$ is written to the frame memory RAM1 during the time interval $t_0$–$T_0$($t_0$: arrival time or start timing of data frame $CH_{20}$), when the alignment mode M3 is activated, whilst the second half of $CH_{20}$ is written to the frame memory RAM1 between $T_0$–$t_1$ ($t_1$: end timing of $CH_{20}$ and start timing of $CH_{21}$). During the frame period before time $T_0$, however, the data frame $CH_{10}$ (which is synchronized to the synchronization clock) has already been written to the frame memory RAM1 in mode M3.

Of course, with the occurrence $T_0$ of the synchronization clock the mode switching is carried out. However, since at the occurrence of the synchronization clock $T_0$ the data frame $CH_{20}$ has not yet been fully written into the frame memory RAM1, the frame memory RAM1 is kept in the write-state for time $T_0 < t < T_1$. Therefore, until the end timing $t_1$ the data frame $CH_{20}$ can be fully written to the frame memory RAM1.

For $t > t_1$ the next time-offset data frame $CH_{21}$ must be written into a frame memory. Since the data frame $CH_{20}$ has already been written to the frame memory RAM1, the writing continues in the second frame memory RAM2 which also has a write-state in the time interval $t_1$–$T_1$. This is indicated with an arrow $c_1$ in FIGS. 2-1a, b, e.

With the occurrence of the next synchronization clock $T_1$, a mode switching is carried out. In the second alignment mode M2 in the time interval $T_1$–$T_2$ the data memory RAM1 assumes a read state RD, the second frame memory keeps its write-state WR and the third frame memory RAM3 switches to a write-state WR. At the end timing $t_2$ of the frame $CH_{21}$ the second frame memory RAM2 has been completely filled and a newly arriving data frame $CH_{22}$ for the second channel $CH_2$ is then written in the frame memory RAM3 which had a read-state in the previous alignment mode M1. This is indicated with $c_2$ in FIGS. 2-1b, c, e.

Of course, with respect to the channel CH1, a partially time-overlapping writing with respect to the common synchronization clock is never necessary here, since the data frames already arrive synchronized to the synchronization clock. Therefore, at $T_0$ the data frame $CH_{10}$ has been completely stored in the frame memory RAM1 and at the occurrence of $T_1$ the channel $CH_{11}$ has been completely written into the second frame memory RAM2 (as indicated with the arrow $d_1$).

The mode switching from M1→M2 achieves the following. In the clock synchronization period $T_1$–$T_2$ the first frame memory now in the read-state RD can be read synchronized through the common synchronization clock since the first frame memory RAM1 has at the occurrence $T_1$ of the synchronization clock completely stored the data frames $CH_{10}$, $CH_{20}$ of both channels although they had a time-offset at their arrival. Thus, the time-alignment is carried out for the two data frames of the two channels CH1, CH2.

The process continues with a further switching at the next occurrence of the synchronization clock $T_2$. Whilst the first half of the frame $CH_{22}$ has been written to the third frame memory RAM3 then in a write state WR in the time interval $t_2$–$T_2$, the switching into the next alignment mode is carried out such that the third frame memory RAM3 keeps its write state WR, the second frame memory RAM2 goes into a read-state and the first frame memory RAM1 goes into a write-state. Thus, the second half of the data frame $CH_{22}$ is written to the third frame memory RAM3 after the switching at time $T_2$ in the time interval $T_2$–$t_3$. Synchronized with the clock $T_2$ the second frame memory RAM2 containing the data frames $CH_{11}$ and $CH_{21}$ is read out. Of course with the occurrence of the end timing $t_3$ of the data frame $CH_{22}$ (which has now been written completely to the third frame memory RAM3) a newly arriving data frame $CH_{23}$ is written into the first frame memory RAM1 which in the alignment mode M2 had a read state RD. The writing of the next data frame $CH_{23}$ to the frame memory which previously had a read-state is indicated with $C_3$ in FIGS. 2-1a, c, e.

Again, with the occurrence of the synchronization clock $T_3$ the alignment mode is switched from M3→M1. However, the first frame memory RAM1 keeps its write state WR. The third frame memory RAM3 which has already completely stored the data frame $CH_{22}$ is switched to the read state RD and is read out beginning with the synchronization clock $T_3$. The second frame memory RAM2 is set into the write state WR. Since the first frame memory RAM1 keeps its write state WR the second half of the data frame $CH_{23}$ is written to the first frame memory RAM1 in the time interval $T_3$–$t_4$. When the next data frame $CH_{24}$ arrives at the start timing $t_4$, this data frame is written into the second frame memory RAM2 which previously had a read state as indicated with the arrow $c_4$ in FIGS. 2-1a,b,e. Whilst writing the second half of $CH_{23}$ and the first half of $CH_{24}$ in the frame interval $T_3$–$T_4$, the third frame memory RAM3 containing completely the data frames $CH_{12}$ and $CH_{22}$ is read out.

The time alignment modes M1, M2, M3, M1 . . . are thus cyclically switched through and after each switching a newly arriving data frame is written into the frame memory which had a read-state before the switching.

It should be noted that FIG. 2-1 only gives one example of a time-offset of half a frame with respect to the common synchronization clock regarding the channel CH2. The general procedure of switching the alignment modes and the reading and writing is, however, generally applicable to any kind of time-offset and of course not only two channels CH1, CH2 but a great plurality of channels (e.g. up to 300 channels) may be processed such that their respective time-offsets with respect to the common synchronization clock can be aligned. In the case of n channels, each frame memory must be capable of storing n data frames at the same time.

FIG. 2-2 is a different time diagram to illustrate the procedure in FIG. 2-1. Again, it is assumed that the data frames of channel CH1 have no time offset while the time offset of the data frames of channel CH2 is half a data frame period. Further channels are supposed to have arbitrary time offsets (CH3 . . . CHn). The time diagram in FIG. 2-2 is to illustrate that for example with the occurrence $T_1$ of the synchronization clock a portion of the data frame CH35 of channel CH3 has already been written to a frame memory in a write-state whilst the rest of the data CH35 arriving after time instant $T_1$ will be written into the same frame memory during the following period $T_1$–$T_2$.

This is likewise true for channel CHn which has a different frame offset (frame offset CHn). The first half of the data frame CH20 is written to a frame memory in the write-state before the time instant $T_1$ and the second half is written into the same memory after $T_1$. As is seen with the clock occurrence $T_2$, from a frame memory in the read state all data frames $CH_{10}$, $CH_{20}$, $CH_{35}$, . . . , CHnx can be read out after $T_2$, where each channel can have its own dedicated timeslot within a 10 ms frame when its data is read.

As shown in FIG. 2-3, which shows the arrangement of the read out data frames CH10, CH20, CH35, . . . , CHnx, these data frames are read out after T2 and are allocated to their associated time slot within the time intervall of 10 ms (see in this connection also the above described FIG. 1-3) until the next occurrence of the synchronisation clock T3.

FIG. 3 is an illustration of the alignment mode switching for a number of successive frames. The numbers 0, 1, 2, 3, 4, 5, 6 denote successive data frames of one individual channel, e.g. channel CH1. With respect to the read-state and write-state of the frame memories, the first to third alignment modes M1, M2, M3 are the same as described in FIG. 2-1. Of course, although it seems for example from the mode M1 that simultaneously data frames 0, 1, 2 are present in the three frame memories RAM1, RAM2, RAM3, for non-zero time-offsets this is in reality never the case. That is, at the end of a synchronization period in which the data frame 0 has been read out, of course data frame 2 might possibly not have been completely written into its respective writestate frame memory, but frame 1 has been completely written into RAM2 then. Thus, it is assumed in FIG. 3 that the reading and writing is carried out as generally indicated in FIG. 2-1, FIG. 2-2.

However, FIG. 3 is to illustrate another aspect of the invention which is important with respect to the writing procedure of new data frames into the write-state memory (IN indicates newly arriving data frames and OUT denotes read out data frames from the read-state frame memory).

As is seen generally in FIG. 3, the newly arriving data frames 2, 3, 4, 5, 6 should preferably be written into the respective frame memory RAM1, RAM2, RAM3, RAM1 which in the previous alignment mode respectively was in a read-state. As is also seen from FIG. 3 the reading out of the data frames results in the sequential provision of the data frames 0, 1, 2, 3, 4.

Thus, the above described time-alignment apparatus and the time-alignment method can provide data frames of a plurality of channels in a time-aligned manner to the decoding resource by means of the output means OM shown in FIG. 1. Thus, data frames with individual time-offsets to a common synchronization clock can be time-aligned and therefore the decoder resources can be used successively for several data frames of a great plurality of channels. Thus, the individual data frames of each individual channel do not need an own dedicated decoder unit. That is, as shown in FIG. 2-3 and as discussed above in connection with FIG. 1-2, 1-3, within each time interval of e.g. 10 ms, one data frame CH10, CH20, CH35, . . . , CHnx number of a predetermined number of channels CH1, CH2, CH3, . . . , CHn is processed by one decoding unit sequentially and several decoding units each provided for a predetermined number of further channels operate parallely in the same 10 ms time interval.

Second Embodiment (Time-Alignment/DE-Interleaving)

Figures 2, 4:
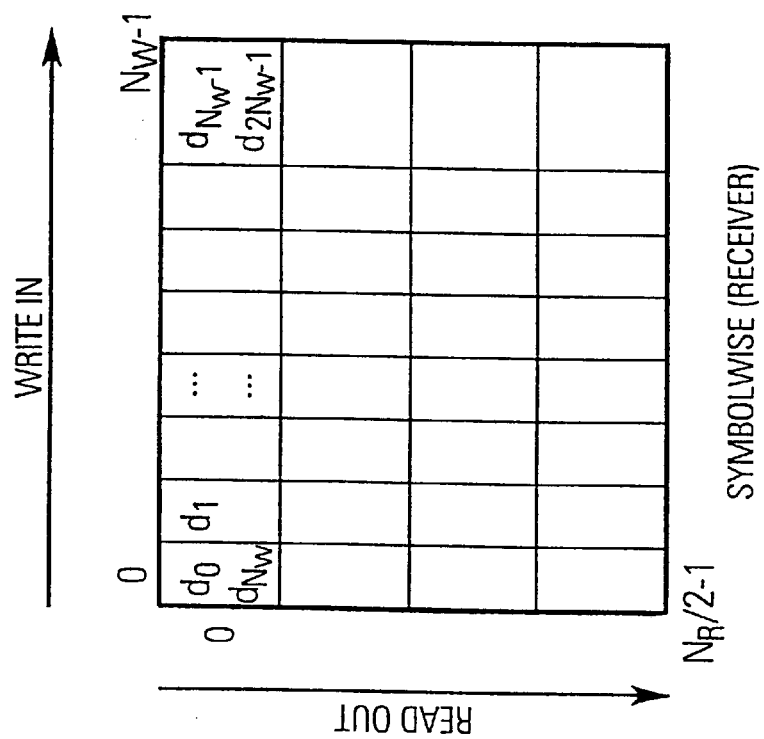
Figures 1, 4:
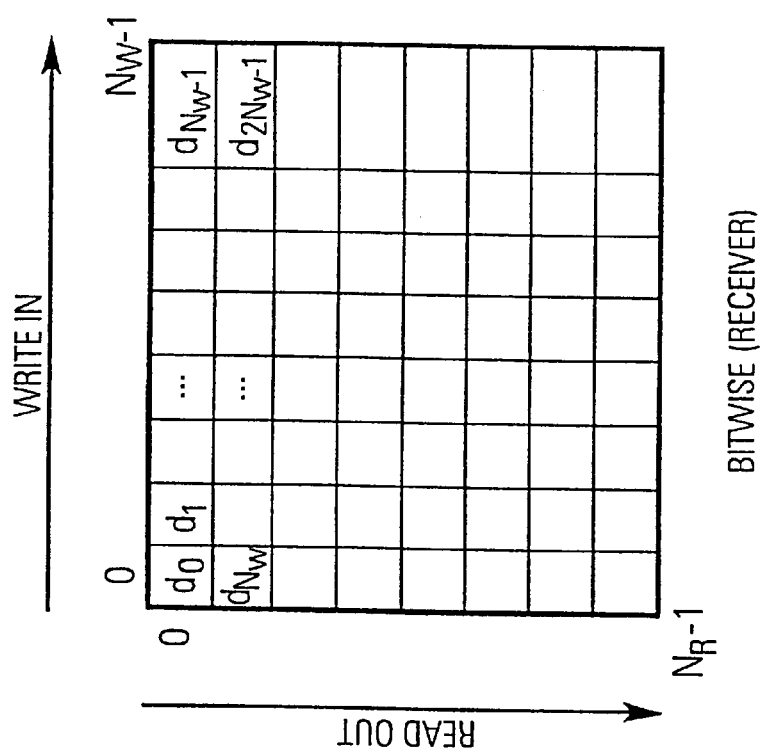

Each frame memory RAM1, RAM2, RAM3 may be constituted as shown with the matrices in FIGS. 4-1, 4-2. That is, the frame memory (matrix) has a number of columns $N_{W-1}$ and rows $N_{R-1}$ for storing said data frames. Each frame memory contains one data frame from all channels. The data frames are written into the row-direction ("write-in" in FIGS. 4-1, 4-2) and with the occurrence of a synchronization clock the data frames can be read out again in the same direction, namely the row-direction.

However, in many transmission systems a bit-interleaving is carried out for each data frame in the transmitter in order to reduce the effects of decision errors made by the equalizer which rather often occur in bursts. Essentially, as is well known, the bit-interleaving distributes the decision errors over the entire time period of the respective data frame. For this purpose, the frame memories also at the transmitter must contain one matrix according to FIG. 4-1, FIG. 4-2 for each channel. For the interleaving at the transmitter, each matrix is filled with a respective data frame in a vertical (or column) direction and during transmission the respective matrices are read out in the horizontal (or row) direction.

A bit-de-interleaving is performed at the receiver in an inverse order. Received data frames are written to the respective matrices in the horizontal direction and read out therefrom in the column direction (see FIG. 4-1; the arrangement of the number of columns and rows determines the desired interleaving depth), before a decoder performs the final channel decoding (e.g. by a convolutional decoder).

If coded and bit-interleaved data is present in the three frame memories RAM1, RAM2, RAM3, the time alignment procedure can be easily combined with the bit-de-interleaving as follows.

Assuming that each frame memory RAM1, RAM2, RAM3 contains one matrix (according to FIG. 4-1, FIG. 4-2) per channel, wherein said matrix is filled with a respective data frame in the row direction, the control unit CU (i.e. its de-interleaving unit DILM) in FIG. 1-1 reads out each matrix column-wise starting with the common synchronization clock. That is, the input means IM in FIG. 1-1 writes one data frame for each of the channels into a respective matrix of the frame memories in the row direction ("write-in" in FIGS. 4-1, 4-2) according to the time alignment mode and writing-in technique described with reference to FIG. 2-1.

On the other hand, whenever reading is performed from a frame memory in read-state, the respective matrix is read out in the column-direction in order to perform the bit-de-interleaving. Performing the row-wise writing and the column-wise reading, the time-alignment can be performed simultaneously with the bit-de-interleaving.

Thus, no additional circuits are necessary to perform the bit-de-interleaving and it is only necessary to switch the reading and writing direction with respect to the matrices of the frame memories. Therefore, the time for processing each data frame can be decreased and the hardware complexity can be minimized.

Third Embodiment (Symbol-Wise Storage)

In many transmission systems and not only in the above described base transceiver station BTS of a CDMA system in FIGS. 5, 6, the time-alignment as well as a channel decoding is performed. For example, a convolutional channel coder in the transmitter outputs several bits as one symbol to be transmitted to the receiver (for each uncoded input bit).

If a soft-output equalizer is used in the receiver, the data arriving in the data frames are the soft-decision symbols detected in the BBRX unit in FIG. 5. The decoder DEC will then perform a convolutional decoding so as to decide on the basis of the soft decision symbols over a great plurality of successive bit times whether "0" or "1" was sent.

However, for this purpose, de-interleaving must be done over the soft symbols rather than the bits, i.e. not the hard bits must be interleaved, but the soft symbols. Thus, according to another aspect of the invention, soft symbols consisting of several bits are always be stored in each memory location of the matrix as is indicated in FIG. 4-2. The symbol-wise storage can be used together with the time-alignment described above. Furthermore, it should be noted that the invention is independent as to whether the DEC-unit is realized by a DSP (digital signal processor) or a FPGA (field programmable gate array) or ASIC (Application Specific Integrated Circuit).

Industrial Applicability

The time-alignment apparatus and the time-alignment method described above use as main components three frame memories and a cyclic switching of the read and write states of these memories. Thus, any kind of data frames from a plurality of channels each having a time-offset with respect to a common synchronization clock (possibly provided by the decoder) can be time-aligned.

If the telecommunication system performs convolutional channel encoding and bit-interleaving, the time-alignment apparatus and the time-alignment method according to the invention can be advantageously applied. A telecommunication system which uses such a channel encoding and decoding as well as interleaving and de-interleaving is a base transceiver station of a CDMA telecommunication system as generally indicated in FIGS. 5, 6. Furthermore, it should be noted that regarding the interleaving process, the row and column directions may be exchanged without any loss of generality.

Furthermore, it should be understood that the invention is not limited to the above described embodiments and examples which are presently considered as the best mode of the invention. However, a skilled person on the basis of the above teachings can derive other variations and modifications of the invention. However, all these modifications and variations fall within the scope of the dependent claims. Furthermore, the invention can comprise embodiments which consist of features which have been separately described in the above specification and/or have been separately claimed in the claims.

Furthermore, reference numerals in the claims only serve clarification purposes and do not limit the scope of the invention.

What is claimed is:

1. A time-alignment apparatus of a receiver of a telecommunication system for receiving successive data frames on a plurality of channels, wherein said respective data frames on said channels are not time-aligned, and for outputting said data frames of all channels time-aligned to a common synchronisation clock, comprising:

a) at least a first, second and third read/write frame memory for respectively storing one data frame of each of said channels, said frame memories each having a write state in which data is written to said frame memories by an input means and a read state in which data is read from said frame memories by an output means; and b) a control unit for cyclically switching said three frame memories through a first to third alignment mode synchronized to said common synchronisation clock such that
      b1) in said first alignment mode said first and second frame memory are in a write state and said third frame memory is in a read state;
      b2) in said second alignment mode said second and third frame memory are in a write state and said first frame memory is in a read state;
      b3) in said third alignment mode said third and first frame memory are in a write state and said second frame memory is in a read state;
      b4) wherein after each mode switching a newly arriving data frame of any channel is always written to a frame memory which was in a read state in the previous mode; and
      b5) wherein data frames are always read from the frame memory having a read state time-aligned to said common synchronization clock.

2. A time-alignment apparatus according to claim 1, wherein each frame memory comprises a plurality of matrices respectively associated with a respective channel, said matrices consisting of a predetermined number of columns and rows according to the desired interleaving depth for storing one respective data frame, wherein said input means writes one data frame for each channel into an associated matrix of a frame memory having a write state in the row direction, and wherein a de-interleaving means reads out data from matrices of a frame memory in a read state columnwise time-aligned with each common synchronisation clock.

3. A time-alignment apparatus according to claim 2, wherein said data of said data frames is data from a demodulator/equalizer composed of soft-decision symbols, wherein said soft-decision symbols are stored in memory cells of matrices of said frame memories.

4. A receiver of a telecommunication system comprising one or more time-alignment apparatus according to claim 1.

5. A receiver according to claim 4,
   wherein said receiver is a CDMA-receiver.

6. A telecommunication system comprising one or more receivers according to claim 4.

7. A telecommunication system according to claim 6,
   wherein said telecommunication system performs communications using a CDMA technique.

8. A telecommunication system according to claim 6,
   wherein
      a transmitter codes said data of said data frames according to a convolutional coding technique, wherein said coded data is stored soft-symbolwise in said frame memories in said receivers.

9. A method for time-alignment of successive data frames on a plurality of channels, wherein said respective data frames on said channels are not time-aligned, and for outputting said data frames of all channels time-aligned to a common synchronisation clock, comprising the following steps:

a) writing data frames into at least a first, second and third read/write frame memory for respectively storing one data frame of each of said channels, said frame memories each having a write state in which data is written to said frame memories and a read state in which data frames is read from said frame memories; and b) cyclically switching said three frame memories through a first to third alignment mode synchronized to said common synchronisation clock, wherein
      b1) in said first alignment mode data frames are written to said first and second frame memory in a write state and data frames are read from said third frame memory in a read state starting with each common synchronization clock;
      b2) in said second alignment mode data frames are written to said second and third frame memory in a write state and data frames are read from said first frame memory in a read state starting with each common synchronization clock;
      b3) in said third alignment mode data frames are written to said third and first frame memory in a write state and data frames are read from said second frame memory in a read state starting with each common synchronization clock; wherein
      b4) after each mode switching a newly arriving data frame of any channel is always written to a frame memory which was in a read state in the previous mode;
      b5) wherein data frames are always read from the frame memory having a read state time-aligned to said common synchronization clock.

10. A method according to claim 9,
    wherein each frame memory comprises a plurality of matrices respectively associated with a respective channel, said matrices consisting of a predetermined number of columns and rows according to the desired interleaving depth for storing one respective data frame, wherein one data frame for each channel is written into an associated matrix of a frame memory having a write state in the row direction, and wherein data from matrices of a frame memory in a read state is read out columnwise time-aligned with each common synchronisation clocks.

11. A method according to claim 9,
    wherein said data of said data frames is data from a demodulator/equalizer composed of soft decision symbols, wherein said soft-decision symbols are stored in memory cells of matrices of said memories.

12. A time alignment apparatus of a receiver of a telecommunication system for receiving successive data frames on a plurality of channels, wherein said respective data frames on said channels are not time-aligned, and for outputting said data frames of all channels time-aligned to a common synchronisation clock, comprising:

a) at least a first, second and third read/write frame memory for respectively storing one data frame of each of said channels, said frame memories each having a write state in which data is written to said frame memories by an input means and a read state in which data is read from said frame memories by an output means; and b) a control unit for cyclically switching said three frame memories through a first to third alignment mode synchronized to said common synchronisation clock such that b1) in said first alignment mode said first and second frame memory are in a write state and said third frame memory is in a read state;

b2) in said second alignment mode said second and third frame memory are in a write state and said first frame memory is in a read state;

b3) in said third alignment mode said third and first frame memory are in a write state and said second frame memory is in a read state;

b4) wherein after each mode switching a newly arriving data frame of any channel is always written to a frame memory which was in a read state in the previous mode; and b5) wherein data frames are always read from the frame memory having a read state time-aligned to said common synchronization clock; and wherein c) each frame memory comprises a plurality of matrices respectively associated with a respective channel, said matrices consisting of a predetermined number of columns and rows according to the desired interleaving depth for storing one respective data frame, wherein said input means writes one data frame for each channel into an associated matrix of a frame memory having a write state in the row direction, and wherein a de-interleaving means reads out data from matrices of a frame memory in a read state columnwise time-aligned with each common synchronisation clock.

13. A time alignment apparatus of a receiver of a telecommunication system for receiving successive data frames on a plurality of channels, wherein said respective data frames on said channels are not time-aligned, and for outputting said data frames of all channels time-aligned to a common synchronisation clock, comprising:

a) at least a first, second and third read/write frame memory for respectively storing one data frame of each of said channels, said frame memories each having a write state in which data is written to said frame memories by an input means and a read state in which data is read from said frame memories by an output means; and b) a control unit for cyclically switching said three frame memories through a first to third alignment mode synchronized to said common synchronization clock such that b1) in said first alignment mode said first and second frame memory are in a write state and said third frame memory is in a read state;

b2) in said second alignment mode said second and third frame memory are in a write state and said first frame memory is in a read state;

b3) in said third alignment mode said third and first frame memory are in a write state and said second frame memory is in a read state;

b4) wherein after each mode switching a newly arriving data frame of any channel is always written to a frame memory which was in a read state in the previous mode; and b5) wherein data frames are always read from the frame memory having a read state time-aligned to said common synchronization clock; and wherein c) each frame memory comprises a plurality of matrices respectively associated with a respective channel, said matrices consisting of a predetermined number of columns and rows according to the desired interleaving depth for storing one respective data frame, wherein said input means writes one data frame for each channel into an associated matrix of a frame memory having a write state in the row direction, and wherein a de-interleaving means reads out data from matrices of a frame memory in a read state columnwise time-aligned with each common synchronisation clock; and d) said data of said data frames is data from a demodulator/equalizer composed of soft-decision symbols, wherein said soft-decision symbols are stored in memory cells of matrices of said frame memories.

14. A method for time-alignment of successive data frames on a plurality of channels, wherein said respective data frames on said channels are not time-aligned, and for outputting said data frames of all channels time-aligned to a common synchronisation clock, comprising the following steps;

a) writing data frames into at least a first, second and third read/write frame memory for respectively storing one data frame of each of said channels, said frame memories each having a write state in which data is written to said frame memories and a read state in which data frames is read from said frame memories; and b) cyclically switching said three frame memories through a first to third alignment mode synchronized to said common synchronisation clock, wherein b1) in said first alignment mode data frames are written to said first and second frame memory in a write state and data frames are read from said third frame memory in a read state starting with each common synchronization clock;

b2) in said second alignment mode data frames are written to said second and third frame memory in a write state and data frames are read from said first frame memory in a read state starting with each common synchronization clock;

b3) in said third alignment mode data frames are written to said third and first frame memory in a write state and data frames are read from said second frame memory in a read state starting with each common synchronization clock; wherein b4) after each mode switching a newly arriving data frame of any channel is always written to a frame memory which was in a read state in the previous mode;

b5) wherein data frames are always read from the frame memory having a read state time-aligned to said common synchronization clock; and wherein c) each frame memory comprises a plurality of matrices respectively associated with a respective channel, said matrices consisting of a predetermined number of columns and rows according to the desired interleaving depth for storing one respective data frame, wherein one data frame for each channel is written into an associated matrix of a frame memory having a write state in the row direction, and wherein data from matrices of a frame memory in a read state is read out columnwise time-aligned with each common synchronisation clock.

15. A method for time-alignment of successive data frames on a plurality of channels, wherein said respective data frames on said channels are not time-aligned, and for outputting said data frames of all channels time-aligned to a common synchronisation clock, comprising the following steps:

a) writing data frames into at least a first, second and third read/write frame memory for respectively storing one data frame of each of said channels, said frame memories each having a write state in which data is written to said frame memories and a read state in which data frames is read from said frame memories; and b) cyclically switching said three frame memories through a first to third alignment mode synchronized to said common synchronisation clock, wherein b1) in said first alignment mode data frames are written to said first and second frame memory in a write state and data frames are read from said third frame memory in a read state starting with each common synchronization clock;

b2) in said second alignment mode data frames are written to said second and third frame memory in a write state and data frames are read from said first frame memory in a read state starting with each common synchronization clock;

b3) in said third alignment mode data frames are written to said third and first frame memory in a write state and data frames are read from said second frame memory in a read state starting with each common synchronization clock; wherein b4) after each mode switching a newly arriving data frame of any channel is always written to a frame memory which was in a read state in the previous mode;

b5) wherein data frames are always read from the frame memory having a read state time-aligned to said common synchronization clock; and wherein c) each frame memory comprises a plurality of matrices respectively associated with a respective channel, said matrices consisting of a predetermined number of columns and rows according to the desired interleaving depth for storing one respective data frame, wherein one data frame for each channel is written into an associated matrix of a frame memory having a write state in the row direction, and wherein data from matrices of a frame memory in a read state is read out columnwise time-aligned with each common synchronisation clock; and wherein d) said data of said data frames is data from a demodulator/equalizer composed of soft decision symbols, wherein said soft-decision symbols are stored in memory cells of matrices of said memories.

* * * * *